United States Patent [19]
Dodwell

[11] 3,775,129
[45] Nov. 27, 1973

[54] PHOTOGRAPHIC GELATINO SILVER HALIDE EMULSION

[75] Inventor: Geoffrey Michael Dodwell, Essex, England

[73] Assignee: Ilford Limited, Ilford, England

[22] Filed: Apr. 4, 1972

[21] Appl. No.: 241,066

[30] Foreign Application Priority Data
Apr. 16, 1971 Great Britain...................... 9,686/71

[52] U.S. Cl....................... 96/84 R, 96/114, 117/34
[51] Int. Cl............................................... G03c 1/04
[58] Field of Search .................... 96/114, 84; 117/34

[56] References Cited
UNITED STATES PATENTS 2,768,080  10/1956  Hellmann et al. ..................... 96/114
3,495,986  2/1970  Franco et al........................... 96/114
3,607,290  9/1971  Butler.................................... 96/114

FOREIGN PATENTS OR APPLICATIONS
1,513,198  2/1968  France................................... 96/114

*Primary Examiner*—Ronald H. Smith
*Attorney*—E. F. Wenderoth et al.

[57] ABSTRACT

This invention relates to new photographic material and a process for the production of said material. The material is produced by coating on a support an aqueous silver halide emulsion which, in addition to gelatin, comprises a copolymer latex derived from I a monomer of the alkyl acrylate type and II a monomer which is a hydroxy substituted alkyl acrylate or methacrylate. With the composition of this invention the difficulties caused by the presence of, e.g., salts of divalent metals an substantially eliminated.

9 Claims, No Drawings

PHOTOGRAPHIC GELATINO SILVER HALIDE EMULSION

Whilst in practice the colloid medium of a silver halide emulsion has almost always consisted wholly of gelatin, numerous proposals to replace the gelatin wholly or in part with other colloids have been made. In particular, it has been proposed in more recent literature to replace part of the gelatin by a water insoluble synthetic polymer included in the form of a latex and numerous advantages have been claimed such additions.

Synthetic polymer latices are generally prepared by polymerisation of the monomers in aqueous media in the presence of a surfactant. Alkyl aryl polyether condensates are known to be particularly useful surfactants for the purpose, though other types may be used.

However, not all synthetic polymer latices are suitable for inclusion in gelatino silver halide emulsions since of course the latex must remain substantially uneffected by other additives commonly present in such emulsions. Thus, in particular, it is well known to include in a gelatino silver halide emulsion, a salt of a divalent metal such as cadmium or lead; such salts often have a powerful sedimenting action on synthetic polymer latices even in the presence of the preferred class of surfactants. Also additives to photographic emulsions, for example optical sensitising dyes, are often added to emulsions as organic solvent solutions. Organic solvents used for this purpose, for example acetone, tend to cause sedimentation of synthetic polymer latices similarly to salts of divalent metals.

It is the object of the present invention to provide a process for the production of photographic material having a silver halide emulsion layer which comprises both gelatin and a synthetic polymer wherein the aforesaid difficulties are substantially eliminated.

According to the present invention there is provided a process for the production of photographic material which comprises at least one gelatino silver halide emulsion layer, which process comprises coating on to a support base an aqueous gelatino silver halide emulsion, the binder of which comprises both gelatin and a latex of a copolymer derived from:

I. a monomer which is an alkyl acrylate or an alkyl methacrylate or a monomer mixture comprising both an alkyl acrylate and an alkyl methacrylate or a monomer mixture comprising either one of the said monomers or the said monomer mixture together with a second ethylenically unsaturated monomer, the monomer or monomers being compounds which when homopolymerised yield water insoluble polymers and II. a monomer which is an hydroxy-substituted alkyl acrylate or methacrylate of the general formula $CH_2 = C(R) CO_2 — R' — OH$ where R is a hydrogen atom or a methyl group and R' is a straight or branched saturated methylene chain having from 2 to 6 carbon atoms, the monomer being one which when homopolymerised yields a water-soluble polymer, and then drying the emulsion layer. The preferred monomer I is butyl acrylate and the preferred monomer II is 2-hydroxypropylmethacrylate.

Whilst the relative proportions of the monomers which go to make up a copolymer may be varied widely, it is of course, essential, since the product must be a latex, that the copolymer should have a relatively low solubility in water. Generally, the proportion of monomer II should not exceed 45 percent by weight of the total monomer mixture, the preferred proportion being 20-30 percent by weight of the monomer mixture. The remainder should either be wholly alkyl acrylate or methacrylate or, if a second ethylenically unsaturated monomer is present as part of the monomer mixture I, it is such that the alkyl acrylate or methacrylate constitutes at least 70 percent by weight of I.

Where I is a mixture of monomer containing a second ethylenically unsaturated monomer, that second monomer may be selected from the wide range available and well known for such copolymerisation, for example acrylonitrile, or vinyl acetate.

When photographic material is prepared by the process of the present invention divalent metal salts present in the aqueous coating mixture do not cause the polymer latex to sediment. Furthermore none of the other addenda present in the aqueous coating mixture cause the polymer latex to sediment.

The resultant photographic material exhibits the usual advantages claimed for photographic material wherein part of the gelatin of the silver halide emulsion layer or layers has been replaced by a polymer latex, that is to say the material shows greater dimensional stability, especially when the photographic material is machine processed after exposure, and the amount of water which is absorbed during processing and which must be removed by drying is decreased.

In order to obtain enhanced dimensional stability of the photographic material when it is to be machine processed it is preferred that the copolymer derived from I and II as hereinbefore defined, present in the aqueous gelatino silver halide emulsion, also comprises about 1 percent by weight of the total of I and II combined of a cross-linking agent. Thus the copolymer the latex of which is present in the aqueous coating mixture is to a certain extent cross-linked. If much more that 1 percent by weight of cross-linking agent has been used in the preparation of the copolymer it tends to be irreversably gelled on polymerisation.

Any cross-linking agent which can cross-link acrylates or methacrylates can be used. Most of these cross-linking agents contain two ethylenically unsaturated double bonds and exemplary of such compounds are dimethacrylate esters such as ethylene glycol dimethacrylate. Usually the commerically obtainable component II of the copolymer contains about 3 percent by weight of ethylene glycol dimethacrylate as an impurity. This is normally sufficient to produce a sufficiently cross-linked copolymer when components I and II are copolymerised. The small amount of cross-linking of the synthetic copolymer does not affect the resistance of the latex made therefrom to sedimentation by salts of divalent metals or by any other addenda present in the aqueous silver halide coating mixture.

It is preferred that the copolymer comprises from 30 to 60 percent by weight of the binder material of the final dried silver halide emulsion layer. Most preferably the copolymer comprises about 40 percent by weight of the binder material of the final dried silver halide emulsion layer. That is to say 40 percent by weight of gelatin has been replaced by the synthetic copolymer.

To achieve maximum dimensional stability of the photographic material when it is to be machine processed it is preferred that part of the gelatin used as an antihalation layer should also be replaced by a synthetic polymer. However because the aqueous gelatin coating compositions used in the production of antihalation layers are less likely to contain addenda which can cause synthetic polymer latices to sediment the choice of suitable synthetic polymers to replace partially the gelatin of an antihalation layer is considerably greater. Nevertheless the synthetic polymer latex used in the present invention is of particular utility in this respect.

The following procedures are illustrative of the production of copolymer latices for use in the present invention:

In these procedure the following dispersing agents were used.

A.
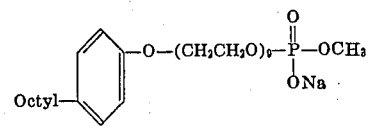

B.
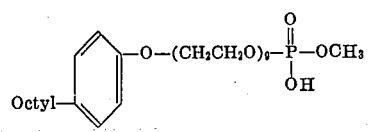

C. $C_8 H_{17} (CH_2 CH_2 O)_6 OH$

Production of copolymer latex coded A

An aqueous medium was prepared which comprised:
Distilled water — 40 g
The dispersing agent A — 0.4 g
Sodium metabisulphite 0.025 g
Sodium persulphate (as polymerisation catalyst) 0.05 g The medium was degassed and heated at 80° C.
To this was added an emulsion which comprised:
Distilled water — 20 g
Butyl acrylate (inhibitor removed by washing with caustic soda) — 14 g
2-Hydroxypropylmethacrylate — 6 g
The dispersing agent A — 0.2 g
The dispersing agent C — 1.0 g The aqueous latex contained about 20 percent by weight of the copolymer produced and had a pH of about 5.0 – 5.5.

Production of copolymer latex Coded B

An aqueous medium was prepared which comprised:
Distilled water — 1,600 g
The dispersing agent B — 8 g
The dispersing agent A — 14 g
Sodium metabisulphite — 1.5 g
Sodium persulphate — 0.75 g This was heated to 80°C and into it was simultaneously pumped equal quantities of media (a) and (b) and such a rate that the temperature remained at 80° C.
Media (a) and (b) comprised respectively:
a. Butyl acrylate — 910 g
2-Hydroxyethyl acrylate — 300 g
Ethylene glycol dimethacrylate ester — 9 g
The dispersing agent B — 8 g
The dispersing agent A — 14 g
b. Distilled water — 1,200 g
Sodium metabisulphate — 1.5 g
Sodium persulphate — 0.75 g The mixture was kept stirred for 4 hours and then steam distilled as before to give a latex containing 32 percent solid copolymer.

Production of copolymer latex Coded C

An aqueous medium was prepared which comprised:
Distilled water — 1,600 g
The dispersing agent B — 8 g
The dispersing agent A — 14 g
Sodium metabisulphate — 2 g
Sodium persulphate — 4 g This was heated to 70°C and into it was simultaneously pumped equal quantities of media (a) and (b) at such a rate that the temperature remained constant. Media (a) and (b) comprised respectively:
a. Ethyl acrylate — 800 g
2-Hydroxypropyl methacrylate — 300 g
Methacrylonitrile — 100 g
The dispersing agent B — 8 g
The dispersing agent A — 14 g
b. Distilled water — 1,200 g
Sodium metabisulphate — 2 g
Sodium persulphate — 4 g The mixture was kept stirred for 5 hours and then steam distilled as before to give a latex of 34 percent solids content.

It is to be understood that the invention includes photographic material prepared by the processes of the present invention and also such photographic material which has been exposed and processed.

The following Examples will serve to illustrate the invention:

EXAMPLE 1 a. A conventional gelatino silver chloro bromide emulsion chemically sensitised and containing stabiliser, optical sensitising dye and coating aids, was prepared. Its gelatin content was 75 g/mole silver halide and it contained 0.05 percent cadmium nitrate.

To this emulsion was added sufficient of an admixture of latex B prepared as hereinbefore described and gelatin to provide that the resulting emulsion contained 60 percent by weight gelatin and 40 percent by weight copolymer, total binder of 150 g/mole of silver. There was no sign of coagulation on adding the latex. The resulting emulsion was coated on to film base and was found to coat smoothly and without difficulty.

b. An emulsion as defined in (a) but containing all gelatin and no latex was prepared as a control emulsion and coated on film base.

Comparing (a) and (b), it was found that the replacement of part of the gelatin by the synthetic polymer did not have any deleterious effect on photographic sensitometric properties, such as speed, contrast and fog.

Moreover, emulsion coating (a) showed less dimensional change on alteration of the ambient humidity, and in a high temperature processing cycle, than did (b).

Similar results were obtained when latices A or C were included in the emulsion in place of part of the gelatin.

EXAMPLE 2

The resistance of latices A, B or C to sedimentation by divalent metals was shown by diluting them with a 5 percent by weight solution of cadmium nitrate. In no case did sedimentation of the copolymer occur. In every case moreover the latices were capable of being diluted indefinitely with cadmium nitrate solution without any sedimentation occurring. However a latex of a homopolymer of butyl acrylate was rendered unstable by the addition of the first few drops of the cadmium nitrate solution and the polymer was precipitated by the continued addition of this solution. Moreover a homopolymeric latex of butyl acrylate prepared in the same way was rendered unstable on the addition of a gelatino solution.

I claim:

1. A photographic material at least one gelatino silver halide emulsion layer of which comprises gelatine and a copolymer derived from
   I. a monomer which is an alkyl acrylate or an alkyl methacrylate or a monomer mixture comprising both an alkyl acrylate and an alkyl methacrylate or a monomer mixture comprising either one of the said monomers or the said monomer mixture together with a second ethylenically unsaturated monomer, the monomer or monomers being compounds which when homopolymerised yield water insoluble polymers and
   II. a monomer of the formula

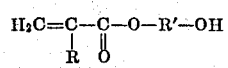

where R is a hydrogen atom or a methyl group and R' is a straight or branched saturated methylene chain having from 2 to 6 carbon atoms, the monomer being one which when homopolymerised yields a water-soluble polymer.

2. A photographic material according to claim 1 which comprises on the side distal to silver halide emulsion layer composed as defined in claim 1 an antihalation layer the binder of which comprises gelatin and a synthetic polymeric material.

3. A silver halide photographic emulsion of which the binder medium comprises both gelatin and a latex of a copolymer derived from
   I. a monomer which is an alkyl acrylate or an alkyl methacrylate or a monomer mixture comprising both an alkyl acrylate and an alkyl methacrylate or a monomer mixture comprising either one of the said monomers or the said monomer mixture together with a second ethylenically unsaturated monomer, the monomer or monomers being compounds which when homopolymerised yield water insoluble polymers and
   II. a monomer which is an hydroxy-substituted alkyl acrylate or methacrylate of the general formula

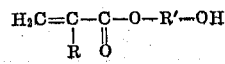

where R is a hydrogen atom or a methyl group and R' is a straight or branched saturated methylene chain having from 2 to 6 carbon atoms, the monomer being one which when homopolymerised yields a water-soluble polymer.

4. A process for the production of photographic material of the composition given in claim 1, which process comprises coating on to a support base an aqueous gelatino silver halide emulsion, the binder of which comprises both gelatin and a latex of a copolymer derived from:
   I. a monomer which is an alkyl acrylate or an alkyl methacrylate or a monomer mixture comprising both an alkyl acrylate and an alkyl methacrylate or a monomer mixture comprising either one of the said monomers or the said monomer mixture together with a second ethylenically unsaturated monomer, the monomer or monomers being compounds which when homopolymerised yield water insoluble polymers and
   II. a monomer which is an hydroxy-substituted alkyl acrylate or methacrylate of the general formula

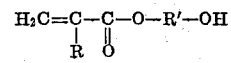

where R is a hydrogen atom or a methyl group and R' is a straight or branched saturated methylene chain having from 2 to 6 carbon atoms, the monomer being one which when homopolymerised yields a water-soluble polymer and then drying the coated layer.

5. A process according to claim 4 wherein monomer I is butyl acrylate.

6. A process according to claim 4 wherein monomer II is 2-hydroxypropylmethacrylate.

7. A process according to claim 4 wherein the proportion of monomer II in the monomer mixture is from 20 to 30 percent by weight.

8. A process according to claim 4 wherein there is present in the aqueous gelatino silver halide emulsion coated on the support about 1 percent by weight of the total of I and II combined of a cross-linking agent of the type which is able to cross-link acrylate or methacrylate polymer chains.

9. A process according to claim 8 wherein the cross-linking agent is ethylene glycol dimethacrylate.

* * * * *